US006702314B1

(12) United States Patent
Crose

(10) Patent No.: US 6,702,314 B1
(45) Date of Patent: Mar. 9, 2004

(54) WHEELCHAIR LIGHTING SYSTEM

(76) Inventor: Dinora M. Crose, 1606 Levern St., Clearwater, FL (US) 33755

( * ) Notice: Subject to any disclaimer, the term of this patent is extended or adjusted under 35 U.S.C. 154(b) by 0 days.

(21) Appl. No.: 10/350,588

(22) Filed: Jan. 24, 2003

(51) Int. Cl.⁷ ............................................... B60Q 1/00
(52) U.S. Cl. ..................................... 280/304.1; 362/459
(58) Field of Search ........................... 280/304.1, 250.1; 362/459, 475; 180/907, 908

(56) References Cited

U.S. PATENT DOCUMENTS

| | | | | |
|---|---|---|---|---|
| 3,179,199 A | * | 4/1965 | Moran ........................ | 180/65.6 |
| 4,078,627 A | * | 3/1978 | Brown et al. ................ | 180/6.5 |
| 4,461,609 A | * | 7/1984 | Zinno ......................... | 414/495 |
| 5,094,314 A | * | 3/1992 | Hayata ....................... | 180/217 |
| D325,892 S | * | 5/1992 | Nesterick et al. ........... | D12/85 |
| 5,363,933 A | * | 11/1994 | Yu et al. .................... | 180/6.5 |
| 5,518,081 A | * | 5/1996 | Thibodeau .................. | 180/210 |
| D403,279 S | * | 12/1998 | Wu ............................ | D12/131 |
| 5,923,096 A | * | 7/1999 | Manak ....................... | 307/10.1 |
| 6,541,938 B2 | * | 4/2003 | Okamura et al. ........... | 318/778 |

* cited by examiner

Primary Examiner—Avraham Lerner
(74) Attorney, Agent, or Firm—Edward P. Dutkiewicz

(57) ABSTRACT

A wheelchair has a horizontal seat and armrests. Forward and rearward supports extend upwardly from the seat and armrests with handles. A plurality of light assemblies is coupled to the wheelchair. Light assembly each have one illumination bulb and one turn signal bulb. A receiver is coupled to each light assembly and a transmitter is coupled to each of the receivers. A control panel has a plurality of operator controlled switches. Each switch is electronically coupled to the transmitter. A headlight switch activates and inactivates the light assemblies of the forward supports. A taillight switch activates and inactivates the light assemblies of the rearward supports. A left blinker switch operates the forward and rearward left light assemblies and a right blinker switch operates the forward and rearward right light assemblies.

6 Claims, 3 Drawing Sheets

WHEELCHAIR LIGHTING SYSTEM

BACKGROUND OF THE INVENTION

1. Field of the Invention

The present invention relates to a wheelchair lighting system and more particularly pertains to safely and efficiently illuminate a wheelchair forwardly and rearwardly.

2. Description of the Prior Art

The use of personal mobility devices is known in the prior art. More specifically, personal mobility devices previously devised and utilized for the purpose of transporting a user are known to consist basically of familiar, expected, and obvious structural configurations, notwithstanding the myriad of designs encompassed by the crowded prior art which has been developed for the fulfillment of countless objectives and requirements.

By way of example, U.S. Pat. No. Des. 403,279 to Wu discloses an electric medical scooter. U.S. Pat. No. Des. 397,645 to Schaffner discloses a motorized wheelchair. U.S. Pat. No. 5,022,476 to Weege discloses a wheelchair. U.S. Pat. No. 6,176,337 to McConnell et al discloses a personal mobility vehicle. Lastly, U.S. Pat. No. 3,179,199 to Moran discloses an electrically propelled chair with compartmented propulsion and recharging systems.

While these devices fulfill their respective, particular objectives and requirements, the aforementioned patents do not describe a wheelchair lighting system that allows safely and efficiently illuminate a wheelchair forwardly and rearwardly.

In this respect, the wheelchair lighting system according to the present invention substantially departs from the conventional concepts and designs of the prior art, and in doing so provides an apparatus primarily developed for the purpose of safely and efficiently illuminate a wheelchair forwardly and rearwardly.

Therefore, it can be appreciated that there exists a continuing need for a new and improved wheelchair lighting system which can be used for safely and efficiently illuminate a wheelchair forwardly and rearwardly. In this regard, the present invention substantially fulfills this need.

SUMMARY OF THE INVENTION

In view of the foregoing disadvantages inherent in the known types of personal mobility devices now present in the prior art, the present invention provides an improved wheelchair lighting system. As such, the general purpose of the present invention, which will be described subsequently in greater detail, is to provide a new and improved wheelchair lighting system and method which has all the advantages of the prior art and none of the disadvantages.

To attain this, the present invention essentially comprises a wheelchair. The wheelchair has a frame. The frame has a horizontal seat. The frame has a pair of arm rests. The arm rests are disposed at a maximum width of the wheelchair seat. In this manner a user may be positioned between the arm rests. The frame also includes downwardly extending left and right forward supports. The frame also has vertically extending left and right rearward supports extending upwardly from the seat and arm rests with rearwardly extending left and right handles. The frame also includes front wheels. The front wheels are rotatably coupled to the forward supports. The frame further includes rear wheels. The rear wheels are rotatably coupled to the rearward supports.

A plurality of light assemblies is provided. The light assemblies are coupled to the wheelchair. At least one light is in a plane between the seat and the arm rests. One light assembly is located on each forward support and on each rearward support on the left side and on the right side. Each light assembly has one illumination bulb. Each light assembly also has one turn signal bulb.

A photosensitive switch is provided next. The photosensitive switch is coupled to the light assemblies to prevent the lights from illuminating when ambient light is detected.

Next, a flat normally off pressure sensitive switch is provided. The pressure sensitive switch is positioned on the wheelchair seat. The switch is coupled to the light assemblies to prevent the lights from illuminating when no user is sitting on the wheelchair seat and pressure sensitive switch.

Further provided is a receiver. The receiver is coupled to each light assembly with a transmitter. The transmitter is also coupled to the photosensitive switch and the pressure sensitive switch.

Provided last is a control panel. The control panel has a plurality of switches. Each switch is electronically coupled to the light assemblies. The plurality of switches includes a headlights switch. The headlights switch illuminates the light assemblies on the forward supports left and right. The plurality of switches also includes a taillights switch. The taillights switch illuminates the light assemblies on the rearward supports left and right. Further included in the plurality of switches is a left blinker switch. The left blinker switch causes the left blinker lights to blink. A right blinker switch is also included. The right blinker switch causes the right blinker lights to blink.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wheelchair lighting system which has all of the advantages of the prior art personal mobility devices and none of the disadvantages.

It is another object of the present invention to provide a new and improved wheelchair lighting system which may be easily and efficiently manufactured and marketed.

It is further an object of the present invention to provide a new and improved wheelchair lighting system which is of durable and reliable constructions.

An even further object of the present invention is to provide a new and improved wheelchair lighting system which is susceptible of a low cost of manufacture with regard to both materials and labor, and which accordingly is then susceptible of low prices of sale to the consuming public, thereby making such wheelchair lighting system economically available to the buying public.

Even still another object of the present invention is to provide a wheelchair lighting system for safely and efficiently illuminate a wheelchair forwardly and rearwardly.

Lastly, it is an object of the present invention to provide a new and improved wheelchair lighting system. A wheelchair has a horizontal seat and armrests. The wheelchair has forward and rearward supports. The supports extend upwardly from the seat and armrests with handles. A plurality of light assemblies is coupled to the wheelchair. Each light assembly has one illumination bulb and one turn signal bulb. A receiver is coupled to each light assembly and a transmitter is coupled to each of the receivers. A control panel has a plurality of operator controlled switches. Each switch is electronically coupled to the transmitter. The switches include a headlight switch for activating and inactivating the light assemblies of the forward supports. The switches include a taillight switch for activating and inactivating the light assemblies of the rearward supports. A left blinker switch for operating the forward and rearward left light assemblies and a right blinker switch for operating the forward and rearward right light assemblies are also included.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
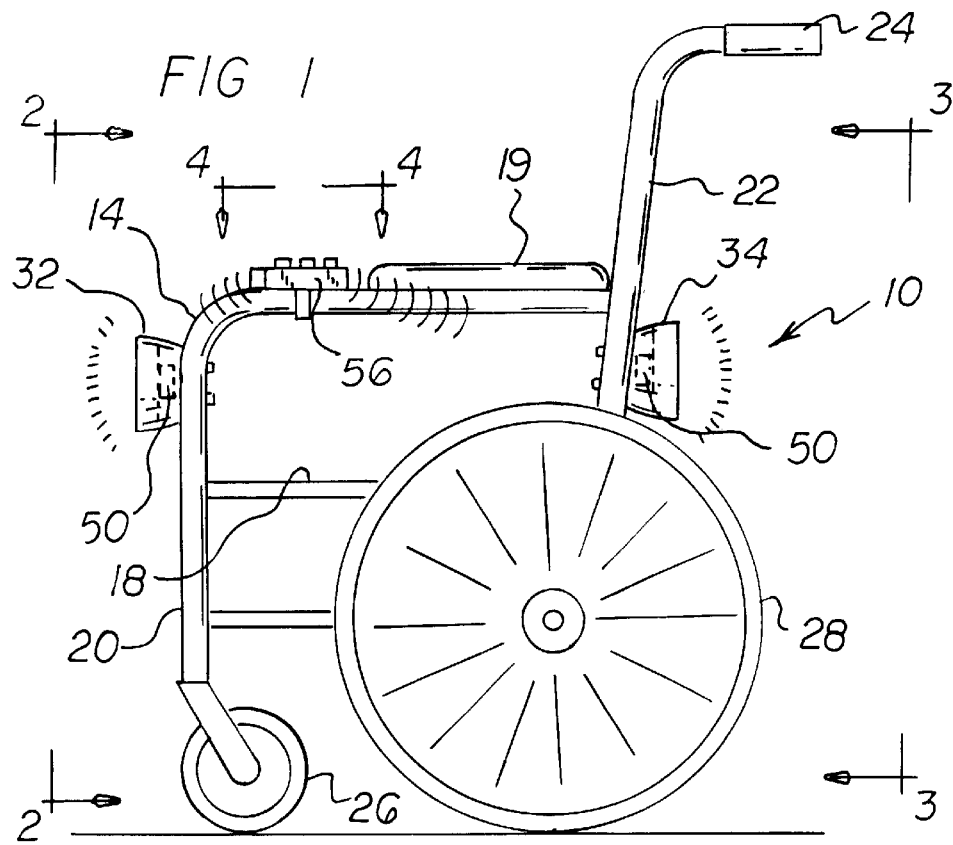
FIG. 1 is a side elevational view of an illuminated wheelchair constructed in accordance with the principles of the present invention.
Figure 2:
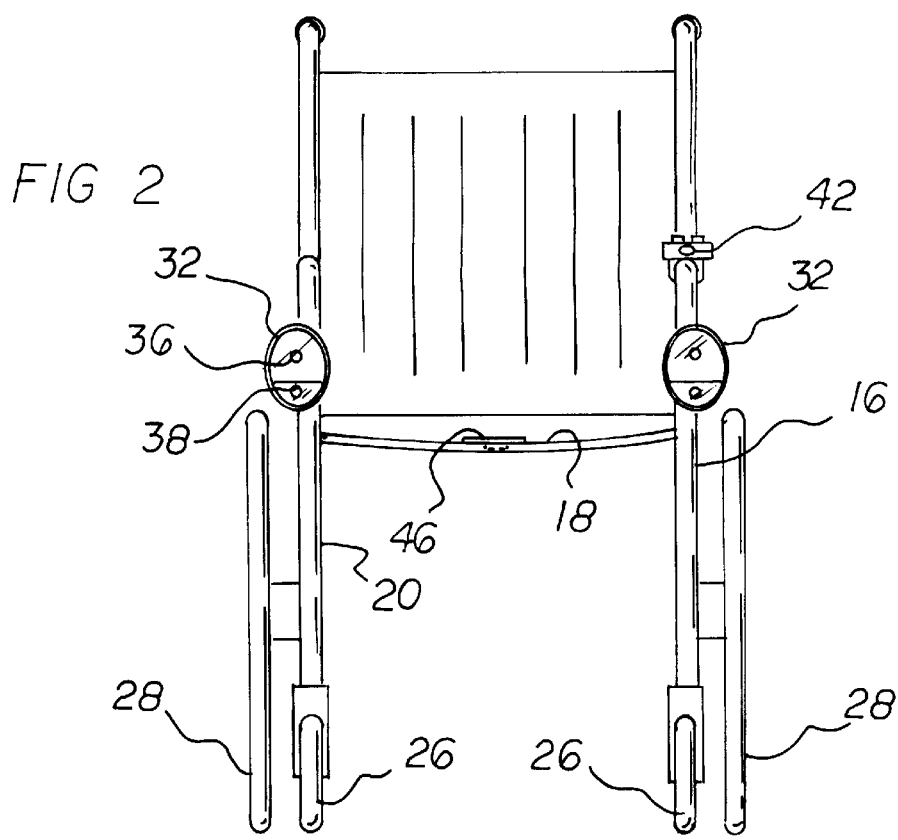
FIG. 2 is a front elevational view of the illuminated wheelchair taken along line 2—2 of FIG. 1.
Figure 3:
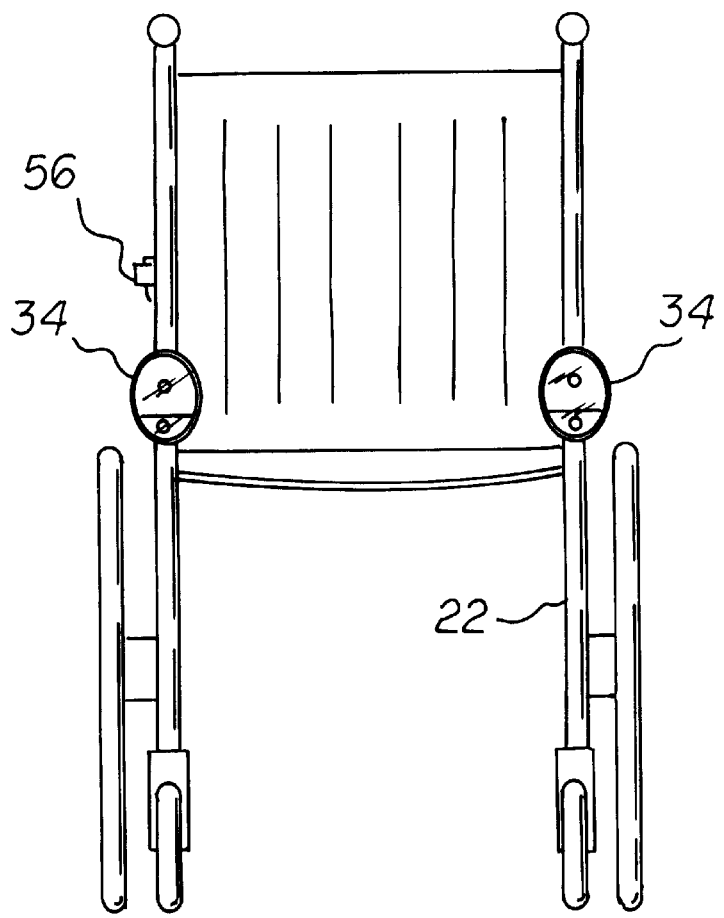
FIG. 3 is a rear elevational view of the illuminated wheelchair taken along line 3—3 of FIG. 1.
Figure 4:
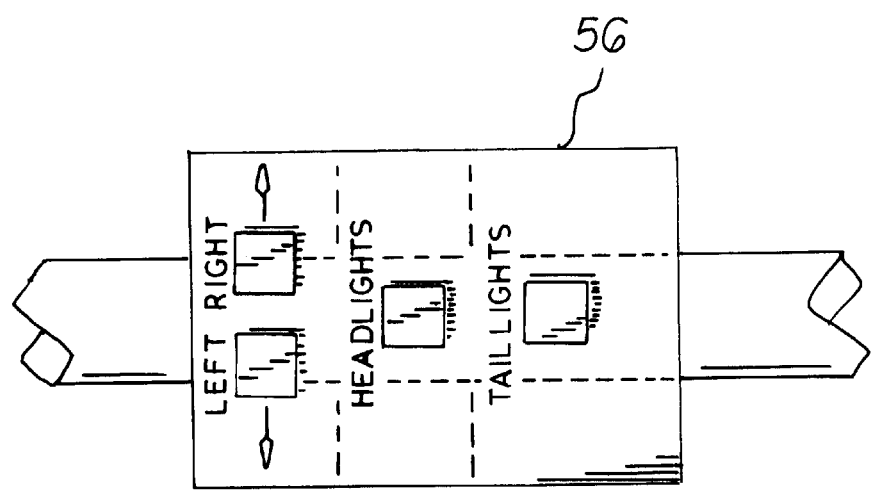
FIG. 4 is a plan view of the control box taken along line 4—4 of FIG. 1.
Figure 5:
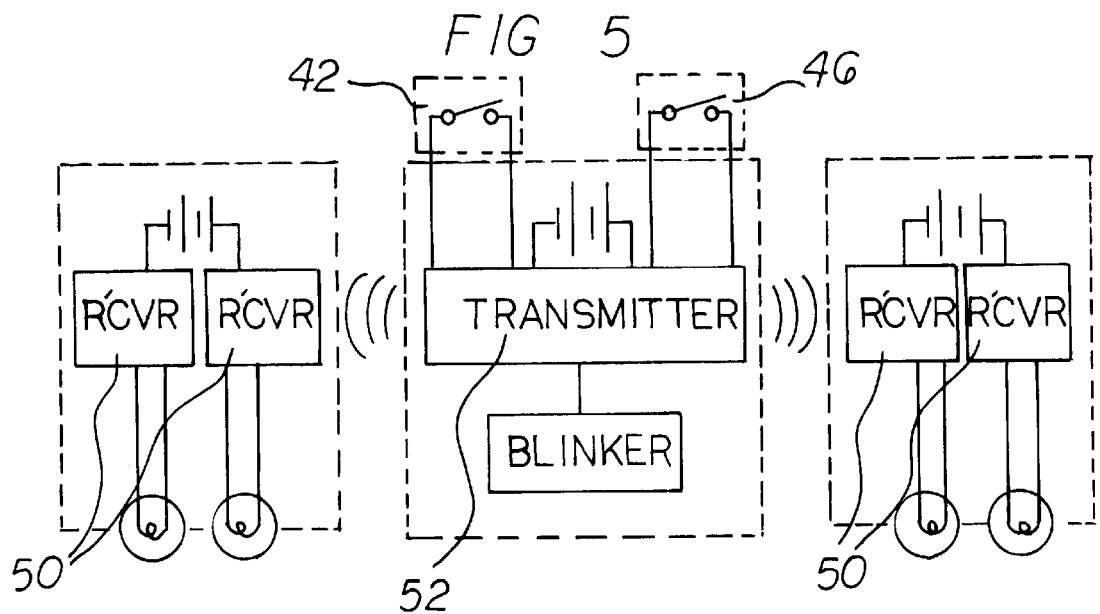
FIG. 5 is an electrical schematic of the illuminated wheelchair of the prior Figures.
Figure 6:
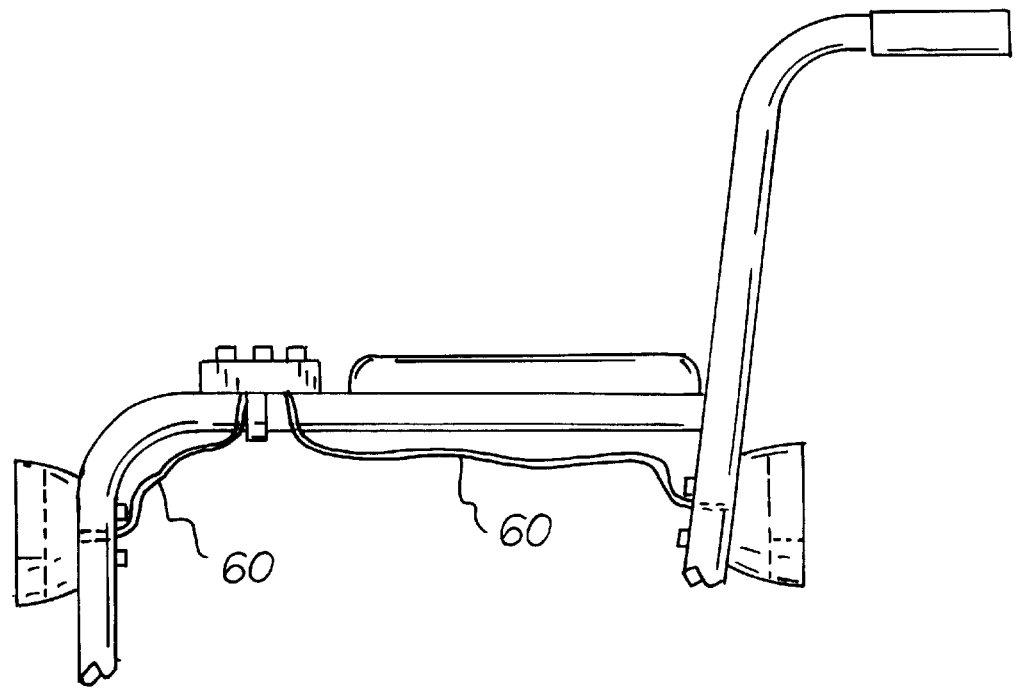
FIG. 6 is a side elevational view of an illuminated wheelchair constructed in accordance with an alternate embodiment of the present invention.

With reference now to the drawings, and in particular to FIG. 1 thereof, the preferred embodiment of the new and improved wheelchair lighting system embodying the principles and concepts of the present invention and generally designated by the reference numeral 10 will be described.

The present invention, the wheelchair lighting system 10 is comprised of a plurality of components. Such components in their broadest context include a wheelchair, a plurality of light assemblies, a receiver, and a control panel. Such components are individually configured and correlated with respect to each other so as to attain the desired objective.

First provided is a wheelchair 14. The wheelchair has a frame 16. The frame has a horizontal seat 18. The frame has a pair of arm rests 19. The arm rests are disposed at a maximum width of the wheelchair seat. In this manner a user may be positioned between the arm rests. The frame also includes downwardly extending left and right forward supports 20. The frame also has vertically extending left and right rearward supports 22 extending upwardly from the seat and arm rests with rearwardly extending left and right handles 24. The frame also includes front wheels 26. The front wheels are rotatably coupled to the forward supports. The frame further includes rear wheels 28. The rear wheels are rotatably coupled to the rearward supports.

A plurality of light assemblies 32, 34 is provided. The light assemblies are coupled to the wheelchair. At least one light is in a plane between the seat and the arm rests. One light assembly is located on each forward support and on each rearward support on the left side and on the right side. Each light assembly has one illumination bulb 36. Each light assembly also has one turn signal bulb 38.

A photosensitive switch 42 is provided next. The photosensitive switch is coupled to the light assemblies to prevent the lights from illuminating when ambient light is detected.

Next, a flat normally off pressure sensitive switch 46 is provided. The pressure sensitive switch is positioned on the wheelchair seat. The switch is coupled to the light assemblies to prevent the lights from illuminating when no user is sitting on the wheelchair seat and pressure sensitive switch.

Further provided is a receiver 50. The receiver is coupled to each light assembly with a transmitter 52. The transmitter is also coupled to the photosensitive switch and the pressure sensitive switch.

Provided last is a control panel 56. The control panel has a plurality of switches. Each switch is electronically coupled to the light assemblies. The plurality of switches includes a headlights switch. The headlights switch illuminates the light assemblies on the forward supports left and right. The plurality of switches also includes a taillights switch. The taillights switch illuminates the light assemblies on the rearward supports left and right. Further included in the plurality of switches is a left blinker switch. The left blinker switch causes the left blinker lights to blink. A right blinker switch is also included. The right blinker switch causes the right blinker lights to blink.

In an alternate embodiment of the present invention, the system further includes wires 60. The wires couple the light assemblies and the control box.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wheelchair lighting system for allowing the user of a wheelchair to safely and efficiently illuminate a wheelchair forwardly and rearwardly comprising, in combination:
    a wheelchair having a frame with a horizontal seat and a pair of arm rests disposed at a maximum width of the wheelchair seat so as to allow a user to be positioned between the arm rests, the frame also including downwardly extending left and right forward supports and vertically extending left and right rearward supports extending upwardly from the seat and arm rests with rearwardly extending left and right handles, the frame also including front wheels rotatably coupled to the forward supports and rear wheels rotatably coupled to the rearward supports;
    a plurality of light assemblies coupled to the wheelchair with at least one light being in a plane between the seat and the arm rests, one light assembly being located on each forward support and on each rearward support on the left side and on the right side, and with each light assembly having one illumination bulb and one turn signal bulb;
    a photosensitive switch coupled to the light assemblies to prevent the lights from illuminating when ambient light is detected;
    a flat normally off pressure sensitive switch positioned on the wheelchair seat and coupled to the light assemblies to prevent the lights from illuminating when no user is sitting on the wheelchair seat and pressure sensitive switch;
    a receiver coupled to each light assembly with a transmitter coupled to each receiver and with the transmitter also coupled to the photosensitive switch and the pressure sensitive switch; and
    a control panel having a plurality of switches contained thereon with each switch electronically coupled to the light assemblies, the plurality of switches including a headlights switch for illuminating the light assemblies on the forward supports left and right and a taillights switch for illuminating the light assemblies on the rearward supports left and right and a left blinker switch for causing the left blinker lights to blink and a right blinker switch for causing the right blinker lights to blink.

2. A wheelchair lighting system:
    a wheelchair with a horizontal seat and armrests and forward supports and rearward supports extending upwardly from the seat and armrests with handles;
    a plurality of light assemblies coupled to the wheelchair with each light assembly having one illumination bulb and one turn signal bulb;
    a receiver coupled to each light assembly and a transmitter coupled to each of the receivers; and
    a control panel having a plurality of operator controlled switches contained thereon, with each switch electronically coupled the transmitter, the switches including a headlight switch for activating and inactivating the light assemblies of the forward supports and a taillight switch for activating and inactivating the light assemblies of the rearward supports and a left blinker switch for operating the forward and rearward left light assemblies and a right blinker switch for operating the forward and rearward right light assemblies.

3. The system as set forth in claim 2 and further including a photosensitive switch coupled to the light assemblies to prevent the lights from illuminating when ambient light is sensed.

4. The system as set forth in claim 2 and further including a flat, normally off pressure sensitive switch positioned on the wheelchair seat and coupled to the light assemblies to prevent the lights from illuminating when no one is sitting on the seat and pressure sensitive switch.

5. The system as set forth in claim 2 wherein the switches include a headlight switch for activating and inactivating the light assemblies of the forward supports and a taillight switch for activating and inactivating the light assemblies of the rearward supports and a left blinker switch for operating the forward and rearward left light assemblies and a right blinker switch for operating the forward and rearward right light assemblies.

6. The system as set forth in claim 2 and further including wires coupling the light assemblies and the control box.

* * * * *